US012783134B2

(12) United States Patent
Krishnamurthy et al.

(10) Patent No.: US 12,783,134 B2
(45) Date of Patent: Nov. 3, 2026

(54) COHERENTLY AGGREGATING OPERATIONAL MEMORY ON PLATFORM NETWORK

(71) Applicant: NVIDIA Corporation, Santa Clara, CA (US)

(72) Inventors: Raghu Krishnamurthy, San Jose, CA (US); William Ryan Weese, Portland, OR (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/630,236

(22) Filed: Apr. 9, 2024

(65) Prior Publication Data

US 2025/0315171 A1 Oct. 9, 2025

(51) Int. Cl.

*G06F 3/06* (2006.01)
*G06F 12/1072* (2016.01)

(52) U.S. Cl.

CPC .......... *G06F 3/0622* (2013.01); *G06F 3/0655* (2013.01); *G06F 3/0679* (2013.01); *G06F 12/1072* (2013.01)

(58) Field of Classification Search

CPC .... G06F 3/0622; G06F 3/0655; G06F 3/0679; G06F 12/1072

See application file for complete search history.

(56) References Cited

U.S. PATENT DOCUMENTS 11,586,385 B1 * 2/2023 Lercari ............... G06F 12/0246
2009/0089573 A1 * 4/2009 Kwon ..................... G06F 15/16 711/149
2016/0055332 A1 * 2/2016 Jeansonne ............ G06F 9/4406 726/22
2022/0100911 A1 * 3/2022 Trikalinou ............ G06F 12/145
2022/0261162 A1 * 8/2022 Hikichi ................. H04L 9/3236
2023/0100958 A1 * 3/2023 Dambal ................ G06F 21/572 713/189
2023/0315340 A1 * 10/2023 Chen ..................... G06F 3/0622 711/154

* cited by examiner

*Primary Examiner* — Jared I Rutz
(74) *Attorney, Agent, or Firm* — Lowenstein Sandler LLP

(57) ABSTRACT

A system includes application processors (APs) at least some of which communicate over a network. The system includes a non-volatile memory device to store at least one of configuration data or firmware that is accessed by the APs. The configuration data or firmware enables operation of respective APs. The system includes a controller communicatively coupled to the APs and the non-volatile memory device. The controller is configured to centralize processing of messages received from the APs and to manage shared access to the non-volatile memory device by the APs.

24 Claims, 8 Drawing Sheets

800

COHERENTLY AGGREGATING OPERATIONAL MEMORY ON PLATFORM NETWORK

TECHNICAL FIELD

At least one embodiment generally pertains to platform computing systems, and more specifically, but not exclusively, to coherently aggregating operational memory on a platform network.

BACKGROUND

Some accelerated systems, which are designed as a distributed server or platform, deploy many application processors (APs) such as modern graphics processing units (GPUs), central processing units (CPUs), and high-speed interconnects for the GPUs and CPUs. For example, these accelerated systems support supercomputing for enterprise applications and artificial intelligence (AI)-related compute functions.

These distributed servers or platforms tend to include multiple flash memories, generally referred to as reprogrammable non-volatile memory, where each flash memory is used to store firmware and data for a respective AP of a set of multiple APs. For example, flash memory devices are known to provide boot support and other configuration parameters for operation of each AP. Further, separate external root of trust (ERoT) devices may be coupled to the flash memory devices to protect the flash memory devices and support security operations related to each AP. Flash memories, however, typically have limited write and erase cycles and are frequently targets for permanent denial of service attacks, such as causing wear-out by triggering excessive writing. Flash memories may also be targets for supply chain attacks where firmware is replaced with malicious code. Moreover, run time attacks on firmware can also cause malicious behavior to wear out flash memories by writing excessively. Given these systems have a variety of APs from many vendors, the APs have varying degrees of resistance to flash wear out and firmware runtime attacks that expose risks to flash attacks. Further, it becomes an expensive and time-consuming investment for system vendors to reduce risk of these types of attacks, which may cause expensive repair.

BRIEF DESCRIPTION OF DRAWINGS

Various embodiments in accordance with the present disclosure will be described with reference to the drawings, in which.

DETAILED DESCRIPTION

Figure 1:
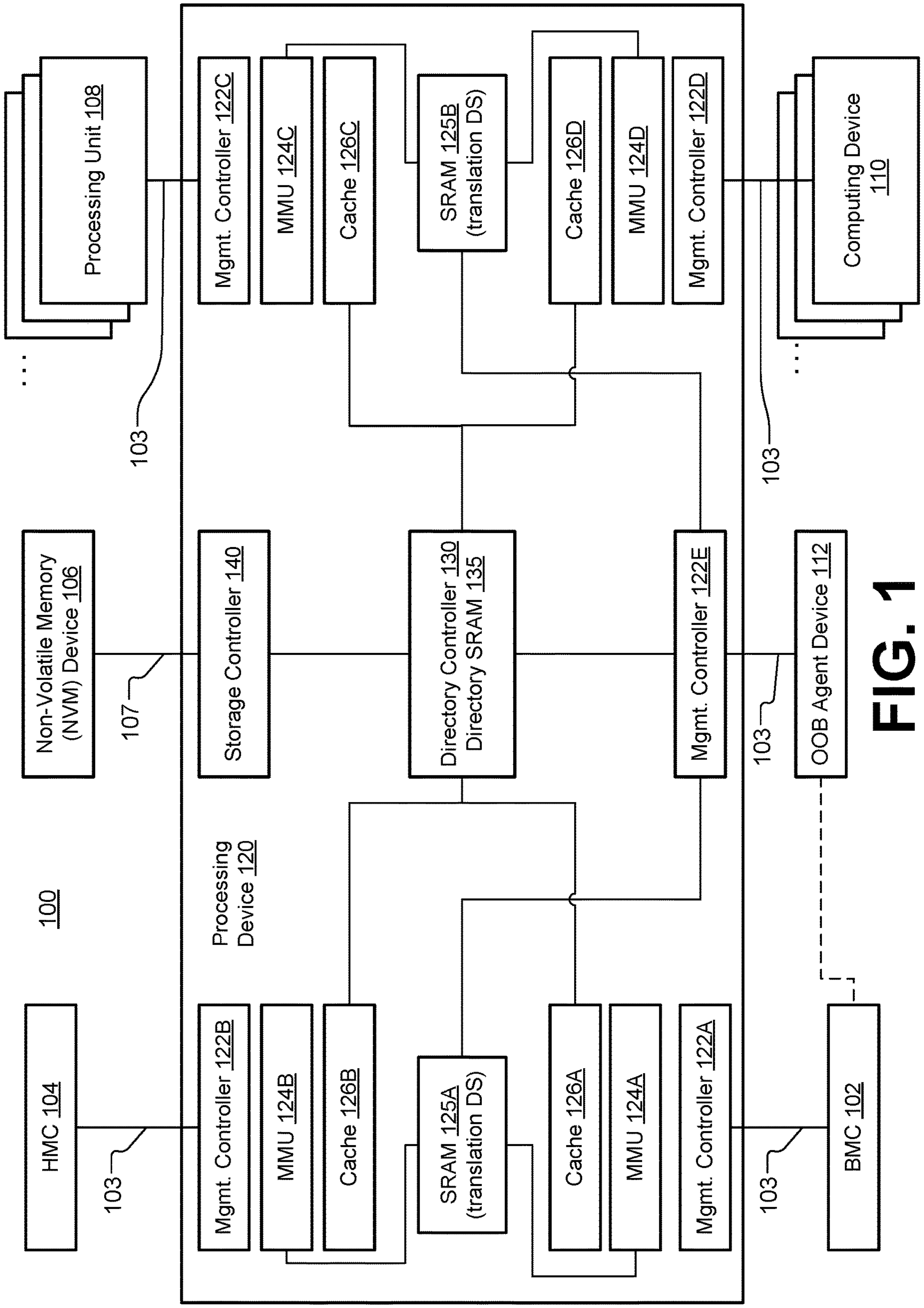
FIG. 1 is a schematic block diagram of an example system supporting distributed APs according to various embodiments.

Further to the above discussion, in some implementations of accelerated systems, flash memories are one of the most vulnerable and important assets because flash memories support the operation and security of distributed APs. Given the large quantity of flash memories in such accelerated systems, securing supply chain(s) of relatively cheap parts is important, as these systems typically need flash memories to boot. Investments can be made to secure supply chain and alternate vendors to satisfy quantity and volume of flash memories. Using alternate vendors means doubling efforts to secure quality parts and ensuring those parts have required performance characteristics appropriate for each AP, which increases non-recurring engineering (NRE) costs. Flash memories are also typically shared for an AP's firmware and data. Lifetimes of these flash memories are further limited by frequency of data writes that requires significant effort in firmware to ensure expected data writes are not so high, even under extreme conditions.

Further, in accelerated systems that are distributed, as was described, different APs communicate with each other, typically via an on-system (or on-platform) network built using particular peripheral bus protocols and using a particular management protocol to enable management of telemetry and security. Such communication may be enabled via a programming and communication model where APs communicate with each other by passing messages using standard protocols across communication interfaces. Given the network-like nature of an accelerated system and the many APs that are present, all-to-all communication between APs is possible, but engineers have to carefully threat model and reduce attack surfaces on communication interfaces to ensure that one AP cannot easily exploit another AP, e.g., due to risks exposed in flash memories. Given the non-homogenous nature of APs and different vendors with different quality of firmware, securing such communication requires significant investment in analysis and mitigations.

Aspects and embodiments of the present disclosure address the above deficiencies of using distributed flash memories by centralizing firmware and configuration data for APs in a distributed system into a non-volatile memory device (e.g., a single storage device) such as a non-volatile memory express (NVMe) device, an embedded multi-media card (eMMC), or the like, although a larger flash memory device may also be employed. Further, embodiments of the present disclosure address the above deficiencies of all-to-all communication between APs by employing a shared memory programming model involving management controllers and memory management units (MMUs).

In some embodiments, for example, a system includes a plurality of application processors (APs) at least some of which communicate over a network such as an on-system or on-platform network. The system may further include a non-volatile memory device to store configuration data and/or firmware that is accessed by the plurality of APs. In embodiments, the configuration data or firmware enables operation of respective APs of the plurality of APs. The system may further include a controller communicatively coupled to the plurality of APs and the non-volatile memory device. The controller (e.g., management controller) may be configured to centralize processing of messages received from the plurality of APs and to manage shared access to the non-volatile memory device by the plurality of APs.

In other embodiments, a system includes a plurality of application processors (APs) including an out-of-band (OOB) agent device and at least one processing unit, such as one or more graphics processing units (GPUs), central processing units (CPUs), and/or data processing units (DPUs). The system may further include a non-volatile memory device to store configuration data and/or firmware that is accessed by the plurality of APs. In embodiments, the configuration data or firmware enables operation of respective APs of the plurality of APs. The system may further include a processing device coupled to the plurality of APs and the non-volatile memory device. In some embodiments, the processing device includes a first management controller coupled to the OOB agent device and a second management controller coupled to the at least one processing unit. The processing device may further include an MMU coupled between the first and second management controllers. In embodiments, the OOB agent device configures the MMU and the MMU enforces permissions to access, by the processing unit, a range of memory addresses of the non-volatile memory device.

Therefore, advantages of the receivers, systems, and methods implemented in accordance with some embodiments of the present disclosure include, but are not limited to, eliminating the need for dozens of flash memory devices with concomitant security risks and costs, which were discussed. The advantages further include providing a faster and more secure centralized interface and associated programming model for accessing a non-volatile memory device in which is stored firmware and configuration data for all (or at least a majority) of the APs in a distributed system. Emulated storage (e.g., managed via virtualization) may be created that is associated with, and mapped to, the non-volatile memory device. In embodiments, such emulated storage facilitates OOB firmware updates, backing storage, streamlined access by the APs to the non-volatile memory device that includes read/write permissions, and wear leveling of the non-volatile memory device. Other advantages will be apparent to those skilled in the art of distributed systems and platforms, such as in data centers, as will be discussed hereinafter.

FIG. 1 is a schematic block diagram of an example system 100 supporting distributed APs according to various embodiments. In embodiments, the system 100 includes a processing device 120 coupled to a non-volatile memory or NVM device 106 and to a plurality of APs, which may be distributed and coupled by way of a platform network. The processing device 120 may centralize control of and access to the NVM device 106, as will be discussed in more detail, thus eliminating the need for many (e.g., dozens) of flash memory devices. In some situations, a group of APs may read from the same location in the NVM device 106 to access certain firmware and/or configuration data, for example. The NVM device 106 may be a high-performing device such as an NVMe device, an eMMC device, or another such NVM device, but could also be a larger flash memory device. In differing embodiments, the processing device 120 is a system-on-a-chip (SoC) such as a field-programmable gate array (FPGA), a microcontroller, or a complex programable logic device that includes an on-board volatile memory device. Other processing devices are envisioned, as these are exemplary.

In various embodiments, the plurality of APs may include, but not be limited to, a baseboard management controller (BMC) 102, a hardware management console (HMC) 104, one or more processing units 108 (e.g., GPUs, CPUs, and/or DPUs), one or more computing devices 110, and an OOB agent device 112. In some embodiments, functionality of the HMC 104 is integrated into the BMC 102, and thus the HMC 104 as a separate component is optional. In embodiments, the one or more computing devices 110 contribute in specific ways to accelerated processing and/or communication through the system 100, including via the platform network. In embodiments, the platform network may be governed by a particular protocol, such as management component transport protocol (MCTP) and/or intelligent platform management interface (IPMI). By way of example only, the one or more computing devices 110 may include specialized switches such as NVLink®, a high-speed interconnect for GPUs and CPUs in NVIDIA-based accelerated systems and platforms, or other supportive computing devices. In some embodiments, at least one of the APs may execute a firmware to perform a security-related service.

Figure 3:
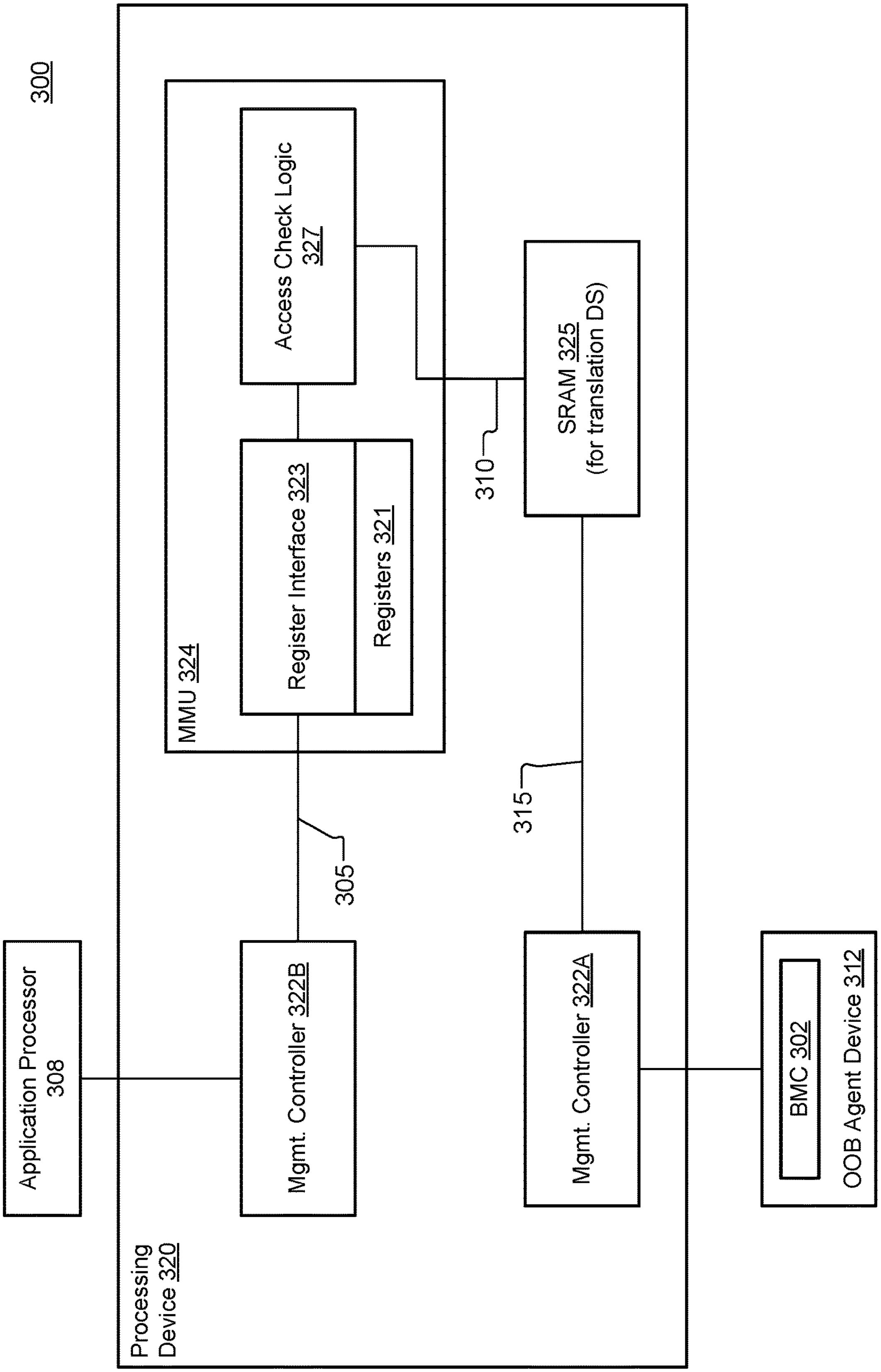
FIG. 3 is a schematic block diagram of an example system describing functionality of a baseboard management controller (BMC) and a memory management unit (MMU) according to at least some embodiments.

In some embodiments, the OOB agent device 112 provides larger OOB management that includes the BMC 102, so when reference is made to the OOB agent device 112, reference may also be understood to be made to the BMC 102 as well (see FIG. 3). For example, an OOB agent may refer to a component and/or software that operates independently of the primary operating system and communication channels to provide management and monitoring capabilities, some of which are described herein in relation to the system 100. Further, the OOB agent device 112 may perform remote management and monitoring of tasks such as powering the system 100 on or off, rebooting, updating firmware, and monitoring system health, e.g., temperature, fan speeds, and the like, without relying on a network stack of the operating system (OS) of the system 100. In embodiments, the OOB agent device 112 also provides security features, such as secure boot verification, hardware-based encryption, and secure remote access, enhancing overall security posture of the system 100. In embodiments, the OOB agent device 112 enables administrators to access logs and diagnostic information to troubleshoot hardware and software issues remotely, even when the system 100 is unresponsive. The OOB agent device 112 can also assist in the deployment of new systems by allowing remote installation of operating systems and configuration settings, streamlining the setup process for new hardware.

In some embodiments, the BMC 102, the HMC 104, the one or more GPUs 108, the one or more computing devices 110, and the OOB agent device 112 are coupled to the processing device 120 through a bus interface 103 such as inter-integrated circuit (I2C), improved inter-integrated circuit (13C), or peripheral component interconnect express (PCIe). In embodiments, the plurality of APs and the processing device 120 intercommunicate using the above-mentioned management protocol (e.g., MCTP or IPMI). In at least some embodiments, the NVM device 106 communicates over a memory bus 107 using a particular memory protocol such as PCIe, serial peripheral interconnect (SPI), or eMMC.

In disclosed embodiments, the processing device 120 includes, but is not limited to, sets of a management controller, an MMU, and a cache to support each AP. While it is possible to include just one instance of each and multiplex these components to different APs, doing so may slow down the system 100 that is specifically designed for acceleration. More specifically, a first management controller 122A may be coupled to the BMC 102 and derive support from a first MMU 124A and a first cache 126A. A second management controller 122B may be coupled to the HMC 104 and derive support from a second MMU 124B and a second cache 126B. A third management controller 122C may be coupled to the one or more processing units 108 and derive support from a third MMU 124C and a third cache 126C. A fourth management controller 122D may be coupled to the one or more computing devices 110 and derive support from a fourth MMU 124D and a fourth cache 126D. In some embodiments, each MMU is configured to enforce permissions (e.g., read, write, or both) to access, by a coupled AP, a range of memory addresses of the NVM device 106. It should be recognized that the processing device 120 may include additional sets of a management controller, an MMU, and a cache, and the four sets of each are illustrated here merely by way of example for purposes of explanation.

In some embodiments, the first, second, third, and fourth caches 126A, 126B, 126C, and 126D, respectively, may be combined into a single cache. Any or all of these caches may be shared across the plurality of APs. In embodiments, the processing device 120 includes a directory controller 130, having a directory static random access memory (SRAM) 135, which is coupled between the cache and the NVM device 106. In embodiments, the directory controller 130 implements cache coherency as between the plurality of APs. Thus, the SRAM 135 may store at least coherency-related metadata.

In embodiments, a fifth management controller 122E is coupled to the OOB agent device 112 and to an SRAM. For example, a first SRAM 125A may be coupled between the fifth management controller 122E and the first and second MMUs 124A and 124B and a second SRAM 125B may be coupled between the fifth management controller 122E and the third and fourth MMUs 124C and 124D. Each MMU may access translation data structure (e.g., tables, matrices, or the like) stored in one of the first and second SRAMs 125A or 125B in order to map virtual address space of an AP through physical cache (which is optional based on whether cache is present) and ultimately to physical address space of the NVM device 106, as will be discussed in more detail with reference to FIG. 3. In some embodiments, the OOB agent device 112 configures the translation data structure with the range of memory addresses assigned to each AP and with the access permissions for respective memory addresses of the range of memory addresses. The OOB agent device 112 may also configure each MMU and others of the plurality of controllers to manage the shared access to the NVM device 106.

In disclosed embodiments, adding an MMU to support an AP allows for managing storage of the NVM device 106 more efficiently, e.g., by moving things around in a backing store of the NVM device 106 (e.g., "backing" the cache) without the APs being aware. If there is an OOB update, the OOB agent device 112 can write to different parts of NVM device 106, and when activated, can be remapped to an AP via the MMU to use new firmware (see FIG. 6-7). The system 100 can also provide redundancy and resiliency built into self-encrypting drives (SEDs), eMMC, NVMe, and other such NVM devices using modern storage management techniques. In this way, the system 100 virtualizes the storage layout of the NVM device 106 such that each AP still thinks it has a fixed layout, but the MMU remaps accesses to the backing store, providing flexibility to optimize and use storage more efficiently, e.g., by considering system level storage usage (as opposed to single APs usage) and increased redundancy by storing more copies of firmware since unified larger storages tend to be cheaper as the size scales.

In embodiments, the directory controller 130 includes its own directory SRAM 135 to track the coherency metadata associated with the first, second, third, and fourth caches 126A, 126B, 126C, and 126D, respectively. While managing coherency through the directory controller 130 is optional, implementing coherency with on-board caches may serve to reduce average access latency to a backing store of the NVM device 106.

In some embodiments, the processing device 120 includes a storage controller 140 coupled between the directory controller 130 (and thus the cache) and the NVM device 106. Although not explicitly illustrated, each of the management controllers 122A-122D may also be coupled to the storage controller 140 and participate in managing access to the NVM device 106 on behalf of a respective AP that is coupled to each management controller.

In various embodiments, any of the plurality of APs may use a unified communication protocol with the processing device 120 by exchanging messages. While the below example employs MCTP, others messaging protocols such as IPMI are also envisioned. For example, communication between the processing device 120 and the plurality of APs may occur using vendor-defined messages (VDMs) of MCTP. In some embodiments, these messages could be defined by the following non-exhaustive examples, including (1) read request and response; (2) posted write request (e.g., no response is required); (3) non-posted write request and response; and (4) a generic notification, which may or may not be related to memory accesses. While headers are defined in the MCTP spec, the following examples expand on message bodies.

An example read request message is illustrated in Table 1. When an AP wants to read data from storage, the AP may send the below message to the processing device. The MCTP has standard public binding specifications for sending defined messages over PCIe or I3C.

TABLE 1

Read Request Message

| Offset | Size (bytes) | Field Name | Description |
|---|---|---|---|
| 0 | 2 | Command code | Should be 0x1 for this request |
| 2 | 8 | Read Address | 64-bit address that needs to be read |
| 10 | 1 | Size to read | Size between 1 and 32 bytes. An MCTP packet can hold up to 64 bytes, and with room for expanding fields, 32 bytes should be sufficient. 0 is an invalid value. |
| 11 | 1 | Reserved | Reserved for future expansion |

An example read response message is illustrated in Table 2. On a read request, this is the response message returned to the AP with the data. The response messages may also be sent via the same bus such as PCIe or I3C. The AP may be guaranteed to get a response within a timeout period, in case of failures. Not receiving a response message within the timeout period is catastrophic and can result in requiring reinitialization of the system.

TABLE 2

Read Response Message

| Offset | Size (bytes) | Field Name | Description |
|---|---|---|---|
| 0 | 2 | Command Code | Should be 0x1 for this response |
| 2 | 2 | Response Code | 0 - success<br>1 - invalid address<br>2 - invalid size<br>3 - read failure<br>4 - timeout<br>5 - Access fault<br>6 - Retry (remap in progress)<br>Other values reserved. |
| 4 | 2 | Reserved | Reserved for future |
| 4:38 | 1-32 | Data | Contains data that was read (payload) |

An example of a posted write request message is illustrated in Table 3. Posted write requests are sent by the AP to the FPGA over PCIe or I3C (or other bus). This posted write request message has no response and writes data to the given address. There is thus no indication of success or failure. The posted write request message may be used for fire and forget performant writes, where loss of data during write is not critical. Invalid addresses, access faults, or sizes are simply dropped and logged for later error triage.

TABLE 3

Posted Write Request Message

| Offset | Size (bytes) | Field Name | Description |
|---|---|---|---|
| 0 | 2 | Command Code | Should be 0x2 for this request |
| 2 | 8 | Write Address | 64 bit Address that needs to be written |
| 10 | 1 | Size to write | Size between 1 and 32 bytes. An MCTP packet can hold up to 64 bytes, and with room for expanding fields, 32 bytes should be sufficient. Zero ("0") is an invalid value. |
| 11 | 1 | Reserved | Reserved for future expansion |
| 12:44 | 1-32 | Write payload | Data to be written |

A non-posted write request works the same way and has the same definition as the posted write request, but may be differentiated by the command code field. The command code field for this request may be 0x3, for example.

An example non-posted write response message is illustrated in Table 4. On a non-posted write request, the below message may be the response returned to the AP with the data. The response message may be sent once it is known that the write request successfully completed at the storage device.

TABLE 4

Non-Posted Write Response Message

| Offset | Size (bytes) | Field Name | Description |
|---|---|---|---|
| 0 | 2 | Command Code | Should be 0x3 for this response |
| 2 | 2 | Error Code | 0 - success<br>1 - invalid address<br>2 - invalid size<br>3 - write failure<br>4 - timeout<br>5 - Access fault<br>Other values reserved. |
| 4 | 2 | Reserved | Reserved for future |

An example generic notification message is illustrated in Table 5. The below message may be sent by one of the message controllers for notifying an AP of any errors such as unrecognized messages or other issues that may occur during operation of the processing device 120, or to notify of any interesting events. The message can be sent autonomously by the processing device 120 and an AP should be prepared to receive and process the message.

TABLE 5

Generic Notification Message

| Offset | Size (bytes) | Field name | Description |
|---|---|---|---|
| 0 | 2 | Command Code | Should be 0x0 for this message |
| 2 | 4 | Notification | 0x1 - Error parsing MCTP packet, invalid format<br>0x2 - Invalid or unsupported message |

In at least some embodiments, the BMC 102 employs a configure MMU command (see Table 6) to set up the translation data structure of the first and second SRAM 125A and 125B for use by an MMU for a given AP, which will be discussed in more detail with reference to FIG. 3. The instance of SRAM to use may be known at system build time since it is known what APs are connected to what ports on the processing device 120. The BMC 102 may send this configure MMU command repeatedly for each region to be mapped and protected and for each AP. The BMC 102 may be expected to know the layout of the firmware image for the given AP to set up the translation data structure.

TABLE 6

Configure MMU Command

| Offset | Size (byes) | Field Name | Description |
|---|---|---|---|
| 0 | 2 | Command code | Should be 0x81 for this request |
| 2 | 8 | AP Address | 64 bit Address that the AP is expected to use |

TABLE 6-continued

Configure MMU Command

| Offset | Size (byes) | Field Name | Description |
|---|---|---|---|
| 10 | 8 | Translated Address | Translated Address to be used for the given AP address |
| 18 | 2 | Access Permissions | 0x1 - read only<br>0x3 - write only<br>0x7 - read/write<br>All other values reserved |
| 20 | 1 | SRAM instance | Selects the instance of the SRAM to write to (one per AP) |

An example configure MMU response message is illustrated in Table 7. This response message may be provided to the BMC 102 in response to the configure MMU request command being handled.

TABLE 7

MMU Response Message

| Offset | Size (bytes) | Field Name | Description |
|---|---|---|---|
| 0 | 2 | Command Code | Must be 0x81 for this response |
| 2 | 2 | Error Code | 0 - success<br>1 - invalid address<br>2 - invalid permissions<br>3 - SRAM write failure<br>4 - timeout<br>Other values reserved. |
| 4 | 2 | Reserved | Reserved for future |

Figure 2:
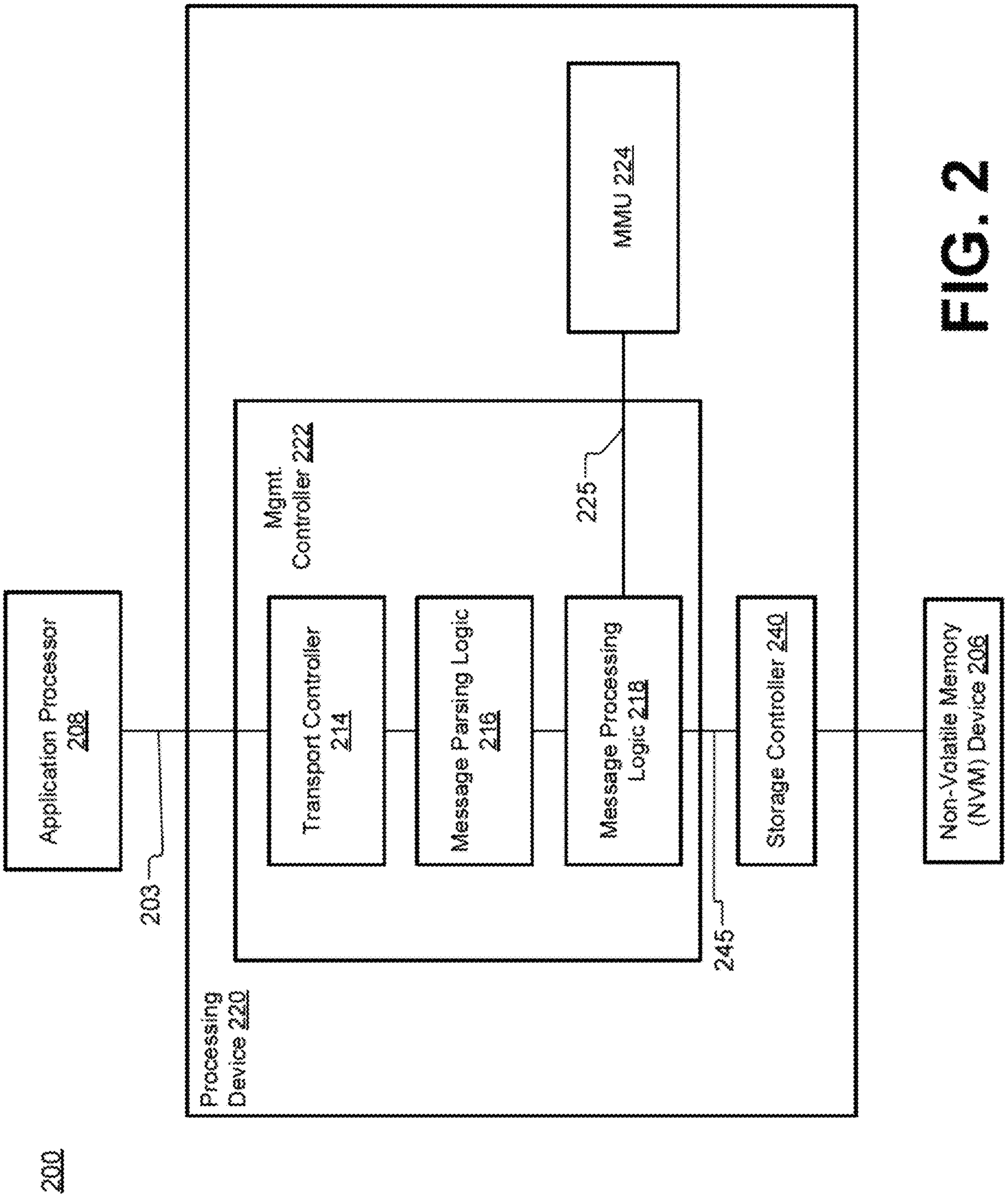
FIG. 2 is a schematic block diagram of an example system describing functionality of a management controller according to at least some embodiments.

FIG. 2 is a schematic block diagram of an example system 200 describing functionality of a management controller according to at least some embodiments. In some embodiments, the system 200 is the system 100 of FIG. 1, but focused on exemplary management controller functionality. In some embodiments, the system 200 includes a processing device 220 coupled to an application processor (AP) 208, which may be any of the plurality of APs discussed with reference to FIG. 1. The processing device 220 may include a management controller 222 coupled to an MMU 224 and a storage controller 240. In embodiments, the management controller 222 includes a transport controller 214, message parsing logic 216, and message processing logic 218.

In at least some embodiments, the transport controller 214 is coupled to the AP 208 of the plurality of APs and is configured to receive a message from the AP 208. In embodiments, the transport controller 214 is configured to employ a standard such as I3C or PCIe for physical transport of bits on a wire, e.g., over a bus interface 203 such as the bus interface 103 previously discussed with reference to FIG. 1.

In some embodiments, the message parsing logic 216 is coupled between the transport controller 214 and the message processing logic 218. In embodiments, the message parsing logic 216 parses the message such that the message processing logic 218 can obtain information within the message. More specifically, the message parsing logic 216 may implement the MCTP specification (or other messaging protocol) for parsing MCTP packets. For example, the message parsing logic 216 processes the headers and in case of failures to parse a header, returns a generic notification message (see Table 5), indicating parsing error. If parsing succeeds, the message parsing logic 216 may pass the payload to the message processing logic 218 with content located in the message or command, e.g., generally in the body of the message or command.

In at least some embodiments, the message processing logic 218 may be coupled between the message parsing logic 216, the MMU 224, and the storage controller 240, which is coupled to the NVM device 106. In embodiments, the message processing logic 218 determines that a command code of the message is valid and obtains, from the MMU 224, a translated address corresponding to a memory address of the message and a permission to access the translated address. The message processing logic 218 may replace, within the message, the memory address with the translated address to generate an updated message. The message processing logic 218 may then send the updated message to the storage controller 240 for use in accessing a physical location in the NVM device 206 matching the translated address.

In embodiments, the system 200 further includes a first protocol interconnect bus 225 coupled between the message processing logic 218 and the MMU 224. The system 200 may further include a second protocol interconnect bus 245 coupled between the message processing logic 218 and the storage controller 240. Either or both of the first protocol interconnect bus 225 and the second protocol interconnect bus 245 may be a processing device interconnect such as open core protocol, advanced microcontroller bus architecture (AMBA), advanced extensible interface (AXI), advanced high-performance bus (AHB), or advanced peripheral bus (APB). The MMU 224 may expose a register interface via these interconnects to the message processing logic 218 (see FIG. 3).

If a message command code is not valid, the message processing logic 218 may return a generic notification message (see Table 5) indicating the invalidity. For each read request message, non-posted write request message, and posted write request message, the message processing logic 218 may interact with the MMU 224, by passing the address and required permission (read or write), and requesting the MMU 224 to provide a response on whether the access is allowed. If the access is disallowed, the appropriate response message may be sent back to the AP 208. For posted write request messages, the request may simply be dropped. If the access is allowed, the message processing logic 218 may send the read or write request messages to the storage controller 240, which can now use the translated address provided by the MMU 224 for interaction with the NVM device 106.

Because the management controller 222 may be used for communication between the BMC 102 and the processing device 120 as well, the message processing logic 218 also may include a protocol-based interface to the SRAM used by the MMU (such as APB), e.g., to one of the first or second SRAMs 125A or 125B (see also FIG. 3). In some embodiments, the management controller 222 is further to encrypt read data and decrypt write data associated with a read request or a write request, respectively, of a message using a standard encryption algorithm known to the plurality of APs.

FIG. 3 is a schematic block diagram of an example system 300 describing functionality of a BMC and an MMU according to at least some embodiments. In embodiments, the system 300 is the system 100 of FIG. 1, but focused on exemplary BMC and MMU functionality. In some embodiments, the system 300 includes a processing device 320 coupled to an exemplary AP 308 of the plurality of APs discussed with reference to FIG. 1 and to an OOB agent device 312, which may be or include a BMC 302. The processing device 320 may include a first management controller 322A coupled to the OOB agent device 312 and a second management controller 322B coupled to the AP 308. The processing device 320 may further include an MMU 324 and an SRAM 325 coupled between the first management controller 322A and the MMU 324. The SRAM 325 may be either of the first or second SRAM 125A or 125B and store a translation data structure (DS) such as translation tables, matrices, or the like.

In some embodiments, the OOB agent device 312 (e.g., the BMC 302) configures the MMU 324 and the MMU 324 is configured to enforce permissions to access, by the AP 308, a range of memory addresses of the NVM device 106. In embodiments, to do so, the OOB agent device 312 can write entries within the translation data structure of the SRAM 325, each entry including at least a translated base address and permissions associated with read request(s) and write request(s) to the translated base address. Understanding that the OOB agent device 312 (e.g., optionally the BMC 302) configures each MMU in the system 100 (see FIG. 1), the OOB agent device 312 may ensure that the range of memory addresses allocated to each AP does not conflict with that of another AP, but in some cases, there may be overlap where a subset of APs shares a firmware image or other configuration data. Mapping and remapping storage and firmware within the NVM device 106 is discussed in more detail with reference to FIGS. 6-7.

In some embodiments, the MMU 324 includes MMU logic such as a register interface 323 and access check logic 327. The register interface 323 may include or be coupled to a plurality of registers 321. In embodiments, the first management controller 322A communicates over a first protocol interconnect bus 305 with the MMU 324, the access check logic 327 communicates with the SRAM 325 over a second protocol interconnect bus 310, and the second management controller 322B communicates with the SRAM 325 over a third protocol interconnect bus 315. These protocol interconnect buses may be based on open core protocol, AMBA, AXI, AHB, APB, or the like.

In embodiments, the plurality of registers 321 include, but are not limited to, an address register to store a logical address, where the translation data structure stored in the SRAM 325 is indexed by particular bits of the address register. The plurality of registers 321 may further include an access register to store whether a read access or a write access is requested; a result register to store whether access is permitted; a translated address register to store the translated base address, which is a physical address mapped to the logical address; and a control register to indicate an access request state.

In some embodiments, in relation to the plurality of registers 321, the first management controller 322A stores the logical address in the address register and stores a value in the access register to indicate one of the read access or the write access. The first management controller 322A may further access values in the control register and the result register to determine that access is permitted to the translated base address in the NVM device 106. The first management controller 322A may further retrieve the translated based address with which to update a message to be sent to the storage controller (e.g., 140 or 240) of the NVM device 106.

In at least some embodiments, the access check logic 327 detects an access check request received from the first management controller 322A and retrieves the logical address from the address register. In embodiments, the access check logic 327 further accesses the translation data structure to translate the logical address to the translated base address, which includes an offset into the range of memory addresses (see FIGS. 5-7), and determines an access permission associated with a type of the access check request. In some embodiments, the MMU 324 uses the APB specification-defined read and write transactions to read protection table entries (e.g., in the translation data structures of the SRAM 325) and perform comparisons for access checks. The access check logic 327 may then store a value in the result register corresponding to the access permission and store, in the translated address register, the translated base address.

If an entry in a particular translation data structure is empty or zero, by default the MMU 324 may prohibit access to the AP in relation to a message being processed. In some embodiments, a remap pending bit in an entry can be used to dynamically block reads and writes temporarily by making the AP 308 retry a memory operation associated with an address for that entry. This may be useful when moving a chunk of data in the backing store of the NVM device 106 to a new location while the AP 308 is operational, which will be discussed in more detail.

Figure 4:
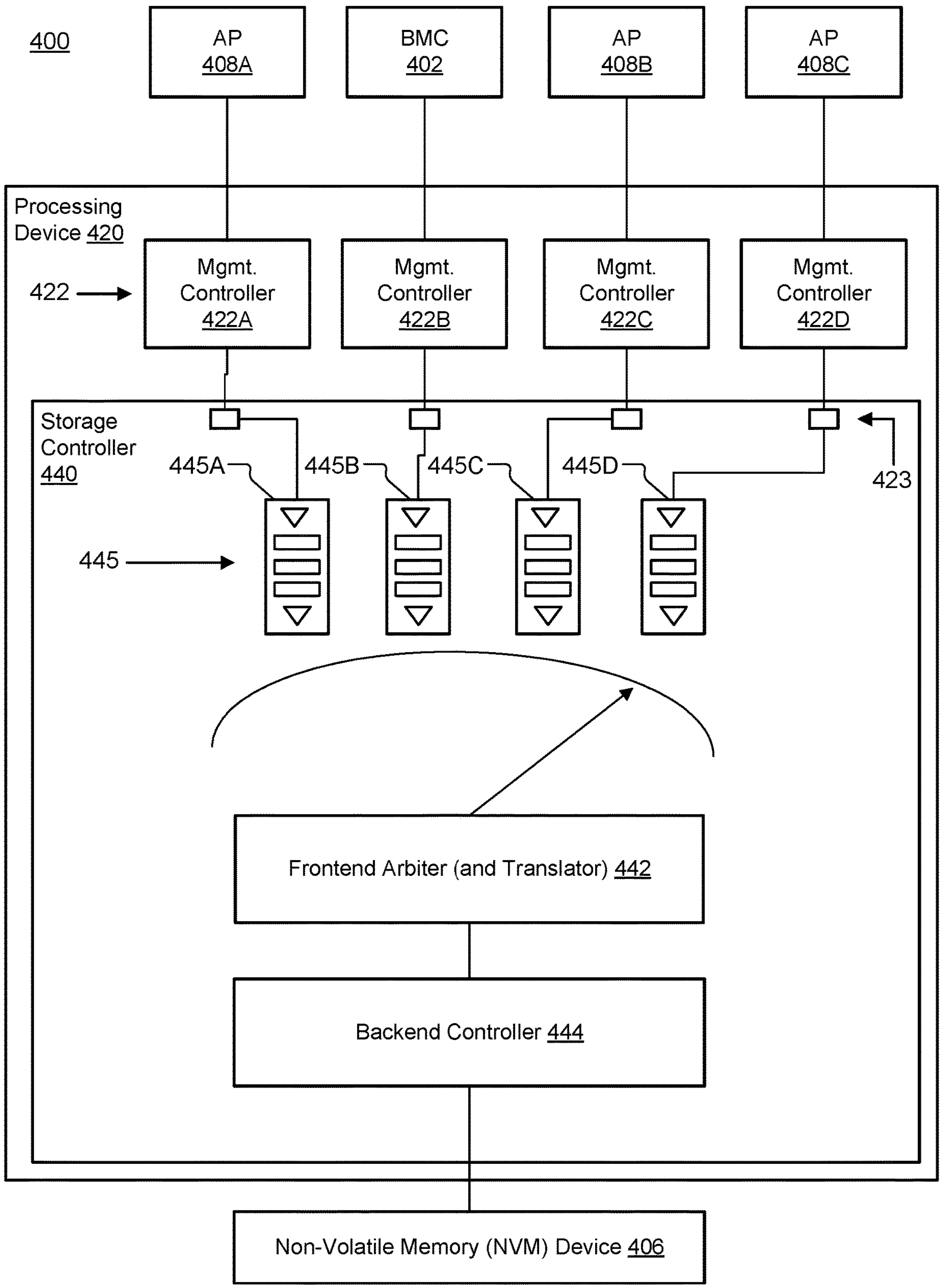
FIG. 4 is a schematic block diagram of an example system describing functionality of a storage controller according to at least some embodiments.

FIG. 4 is a schematic block diagram of an example system 400 describing functionality of a storage controller according to at least some embodiments. In some embodiments, the system 400 is the system 100 of FIG. 1 and is illustrated to focus description of design aspects of the storage controller 140. In embodiments, the system 400 includes a plurality of APs, such as a first AP 408A, a BMC 402 (or OOB agent device), a second AP 408B, and a third AP 408C, a processing device 420, and a non-volatile memory (NVM) device 406. In embodiments, the processing device 420 includes a set of management controllers 422 (e.g., management controllers 422A, 422B, 422C, and 422D) coupled to respective APs of the plurality of APs and a storage controller 440 coupled to the set of management controllers 422.

In various embodiments, the storage controller 440 includes a plurality of ports 423, each coupled to one of the set of management controllers 422A-422D. The storage controller 440 may include a set of request queues 445 (e.g., request queues 445A, 445B, 445C, and 445D). In embodiments, each request queue is coupled to a different port of the plurality of ports 423 and is configured to queue messages, including the message, and associated data. In embodiments, the storage controller 440 further includes a frontend arbiter 442 coupled to the set of request queues 445 and configured to iteratively select an entry from each of the set of request queues 445, e.g., in a round robin fashion. In embodiments, the storage controller 440 further includes a backend controller 444 coupled to the frontend arbiter 442 and the NVM device 406. The backend controller 444 may be configured with a non-volatile memory protocol compatible with writing to and reading from the NVM device 406. In embodiments, the backend controller 444 further can encrypt write data or decrypt read data associated with a write request or a read request, respectively, of the message using a vendor-specific encryption algorithm associated with the application processor (e.g., any of the plurality of APs).

Figure 5:
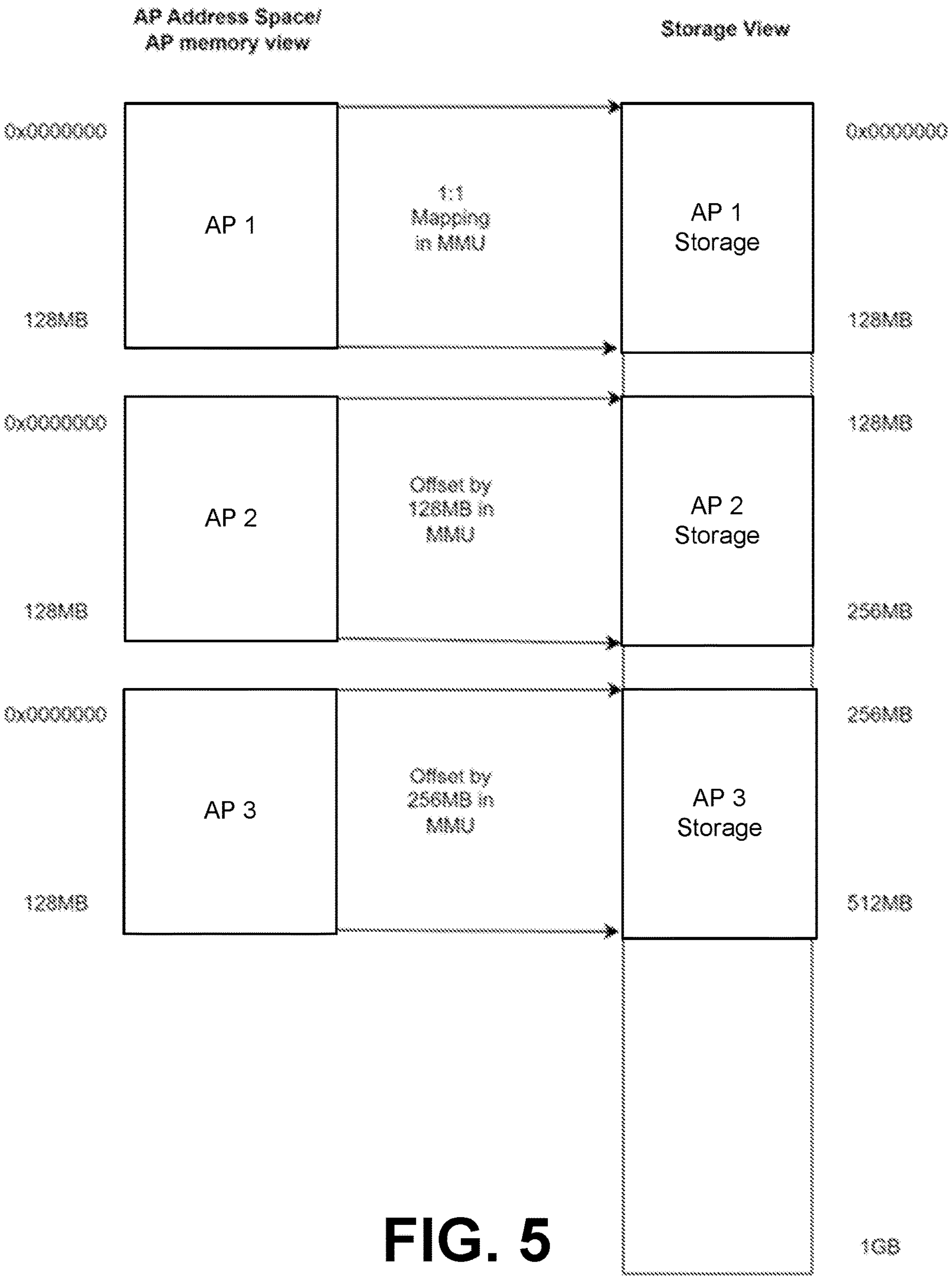
FIG. 5 is a graphical diagram representative of virtualized mapping between AP address space and storage in an aggregated non-volatile memory device supporting multiple APs according to at least one embodiment.

FIG. 5 is a graphical diagram representative of virtualized mapping between AP address space and storage in an aggregated non-volatile memory device (e.g., any of the NVM devices 106 or 406) supporting multiple APs according to at least one embodiment, only for purposes of explanation. Many other similar configurations are envisioned. Any MMU described above can remap an incoming address from the AP to any outgoing address, as configured by the OOB agent device or BMC. An example setup may include a processing device such as an FPGA, connected to four different APs, and connected to the backend of 1 gigabyte (GB) of an NVMe storage drive (e.g., the NVM device 106), illustrated as the "Storage View" in FIG. 5.

For such an MMU implementation, each AP can address 128 megabyte (MB) of memory. The BMC can partition the 1 GB into eight partitions of 128 MB each. Since there are four APs, the BMC can configure each of the MMU SRAMs such that when a first AP (AP 1) produces address 0, the first AP maps to the first block of 128 MB in storage (1:1 mapping). For a second AP (or AP2), when the MMU maps to zero ("0"), the address is offset by 128 MB, and can be set up in the MMU SRAMs similarly for AP3 and AP4. In this way, the APs, can communicate with an address range of 0x0 to 128 MB, but are being remapped and translated (virtualized) to different blocks in the NVMe drive. This is a simplest example, but can be extrapolated to different types of NVM devices, different sizes of memory, and different sizes of blocks mapped to each AP.

Figure 6:
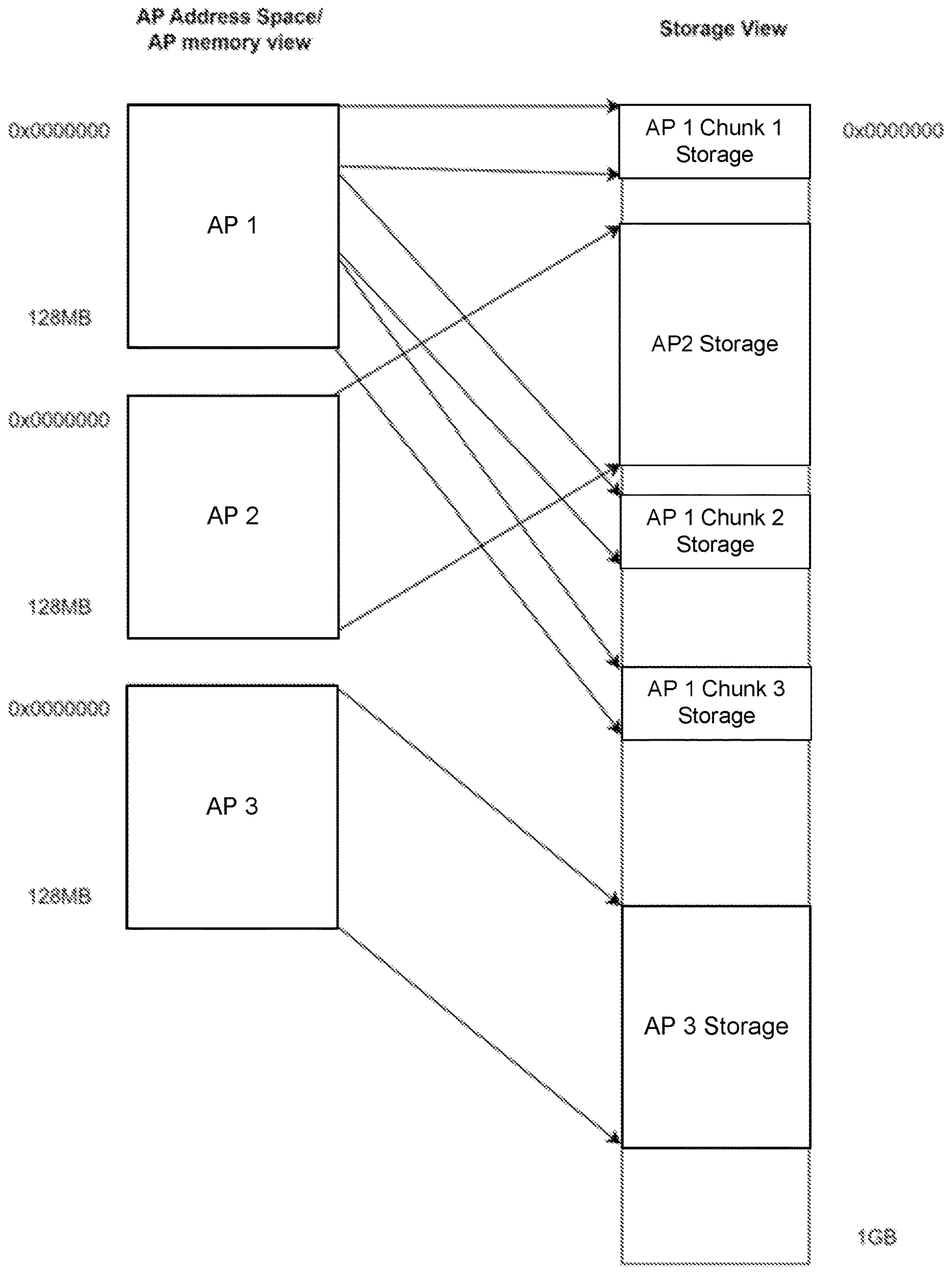
FIG. 6 is a graphical diagram representative of the virtualized mapping of FIG. 5 while dynamically switching to map an AP to a different storage block according to at least one embodiment.

FIG. 6 is a graphical diagram representative of the virtualized mapping of FIG. 5 while dynamically switching to map an AP to a different storage block according to at least some embodiments. Since the translation tables in the SRAM may work at a 4 kilobyte (KB) granularity, only by way of example, the OOB agent device or BMC can create fine-grained mapping such that each 4 KB address range from the AP can map to arbitrary storage blocks on the NVM device 106 in the AP address space.

The same technique can be used to dynamically switch blocks mapped to the AP. For example, in FIG. 6, the final location of chunk 2 of storage for first AP (AP1) can first be marked as "remap pending" in the MMU tables, forcing the first AP to retry the read or write transaction, while the chunk 2 is copied to a new location, and the MMU data structure is updated to point to the new location. This can be useful to rearrange the storage to make efficient use of the backing storage of the NVM device 106. Using this mechanism, each AP only knows a respective AP is talking to a virtualized address space between 0 and 128 MB, while the backing store can be mapped and remapped to different locations physically.

For example, with additional reference to FIG. 3, each entry in the SRAM 325 data structure may include a bit indicating whether a remapping of the range of memory addresses is taking place. In such embodiments, the OOB agent device 312 (or BMC 302) communicates, through the first management controller 322A, to the NVM device 106 to move configuration data from the range of memory addresses to a new range of memory addresses. The OOB agent device 312 may further assert the bit of each entry in the translation data structure to indicate to the second management controller 322B that the processing unit (e.g., the AP 308) is to retry access requests during remapping. The OOB agent device 312 may further update the entries in the translation data structure to be mapped to the new range of memory addresses of the NVM device 106 according to the remapping.

Figure 7:
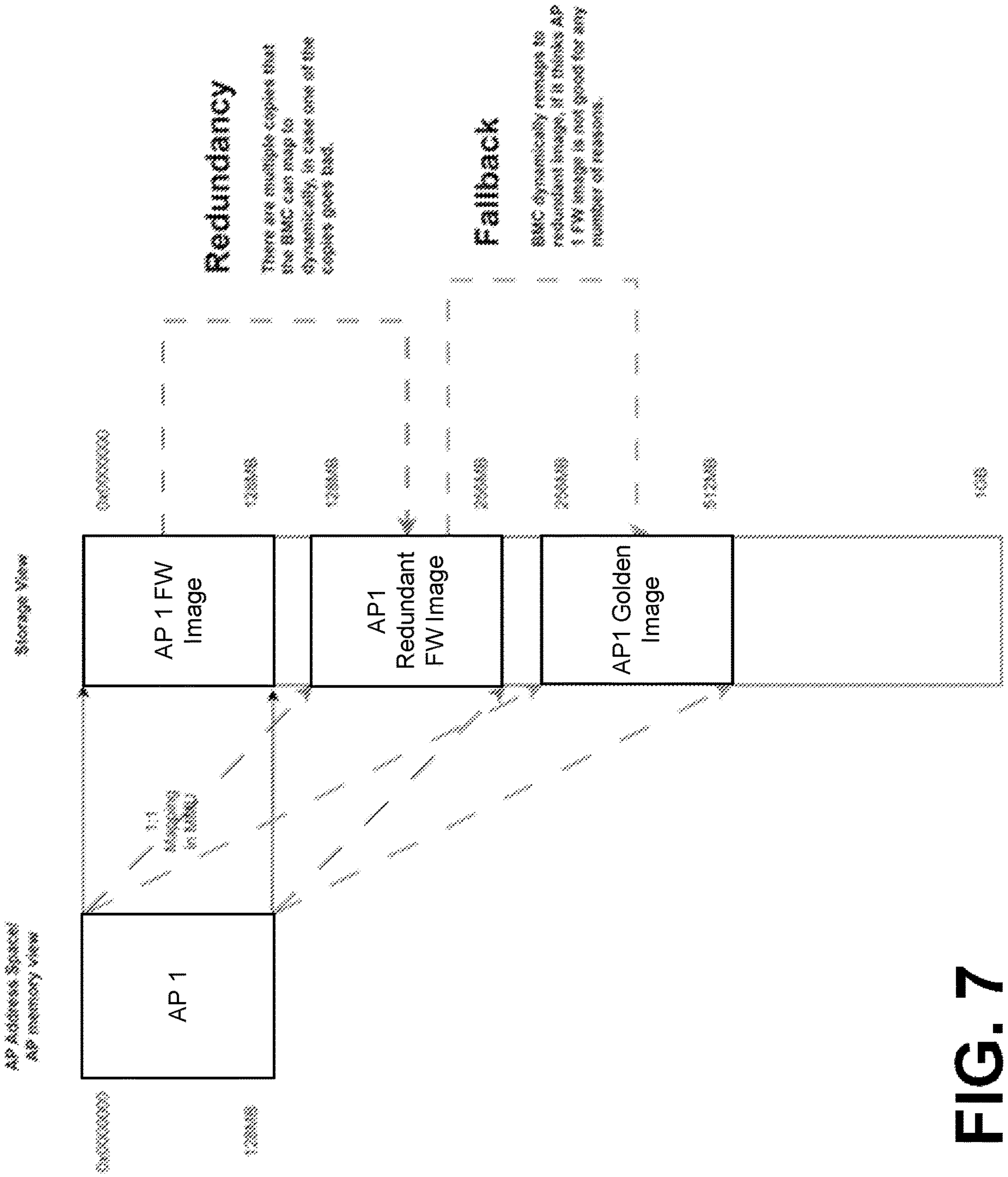
FIG. 7 is a graphical diagram representative of the virtualized mapping of FIG. 5 that provides redundancy of firmware, which enables automated fallback to a previously known good copy of the firmware, according to at least some embodiments.

FIG. 7 is a graphical diagram representative of the virtualized mapping of FIG. 5 that provides redundancy of firmware, which enables automated fallback to a previously known good copy of the firmware, according to at least some embodiments. With the virtualized storage between the processing device 120 and the NVM device 106, the system 100 can provide redundancy of firmware for at least some of the plurality of APs by storing multiple copies of the firmware (and multiple versions, which can include known good versions), without the knowledge of the AP. The AP may only see the one copy of firmware that is mapped to the backing store of the NVM device 106, but the BMC 102 or 302 can keep multiple copies in the backing store. In case there are issues with the copy that is mapped to the AP (perhaps the hash did not match, or the BMC detected bit flips), the BMC 102 or 302 can dynamically switch, as described with reference to FIG. 6, the AP to point to a new or different firmware. This provides redundancy since there are multiple copies.

Automatically falling back to a known good image is an extension of redundancy. Since there are multiple copies of the firmware image stored in the NVM device 106, when the AP fails to boot (usually detected by standard BMC mechanisms such as boot complete notifications from AP to BMC), the BMC 102 or 302 can dynamically remap the AP to a new or different (e.g., golden) working firmware image, from which to boot.

As was discussed, in some embodiments, each entry in the SRAM 325 includes a bit indicating whether a remapping of the range of memory addresses is taking place. In embodiments, a second range of memory addresses of the NVM device 106 stores a known functional copy of firmware for the processing unit (e.g., the AP 308). In embodiments, the OOB agent device 312 (or BMC 302) detects an error in a boot process of the processing unit (e.g., the AP 308) when booting with firmware stored at the range of memory addresses. The OOB agent device 312 may further assert the bit of each entry in the translation data structure to indicate to the second management controller that the at least one processing unit is to retry access requests during remapping. The OOB agent device 312 may further update the entries in the translation data structure to be mapped to the second range of memory addresses of the NVM device 106 according to the remapping.

In some embodiments, the remapping and providing redundancy of firmware and configuration data may improve reliability and extensibility of storage and overall speed of writing data to storage by using new interfaces and newer technologies, without the APs ever having to know that something changed within the NVM device 106. In typical systems, in contrast, individual flash memories would have to be physically replaced to upgrade speed, reliability, and security.

In some embodiments, recovery and automatic fallback to known good images is also simpler with the system 100. For example, in case of a failure to boot a new firmware after a firmware update, the processing device 120 can simply remap, using the MMU 324, to one or more previously known good firmware images. In contrast, in traditional and existing design, there is one golden copy or known good copy at a fixed known location. The redundancy policy has to be baked into an AP's functionality with the traditional design. In the present system 100, however, even if the AP does not have redundancy built in, the processing device 120 can virtualize the storage of the NVM device 106 to provide redundancy and automatic fallback.

In traditionally designed systems, SPI monitoring-based filtering is built into the ERoT devices coupled to flash memory devices. For example, today's ERoT devices have a capability that allows monitoring NVM device transactions. Implementation of that monitoring causes significant design complexity and can depend on the AP behaving correctly. In the present system 100, as storage communication is command-response based, the system 100 can respond with a crisp error and enable handling access control errors gracefully. In embodiments, the system 100 is also not dependent on AP using the right frequency to access the SPI flash for the SPI monitoring to work, hence providing better security.

Figure 8:
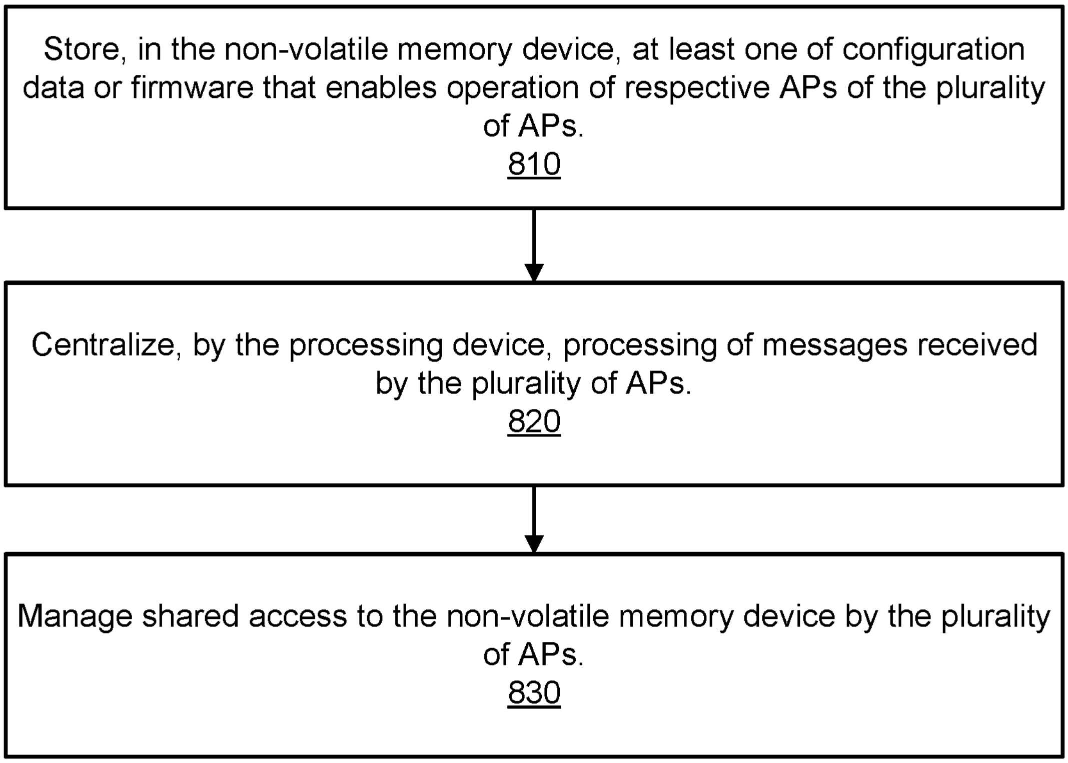
FIG. 8 is a flow chart of an example method for operating a system to coherently aggregate operational memory on a platform network according to at least one embodiment.

FIG. 8 is a flow chart of an example method 800 for operating a system to coherently aggregate operational memory on a platform network according to at least one embodiments. The method 800 can be performed by processing logic comprising hardware, software, firmware, or any combination thereof. For example, the method 800 can be performed by the system 100 or by particular components of the system 100 (see FIG. 1), e.g., a system including a plurality of APs, a non-volatile memory device to be shared by the plurality of APs, and a processing device coupled to the plurality of APs and the non-volatile memory device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic stores (or causes to be stored), in the non-volatile memory device, at least one of configuration data or firmware that enables operation of respective APs of the plurality of APs.

At operation 820, the processing logic centralizes processing of messages received by the plurality of APs.

At operation 830, the processing logic manages, by the processing device, shared access to the non-volatile memory device by the plurality of APs.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or parallel, continuously, or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A system comprising:

a plurality of application processors (APs) at least some of which communicate over a network;

a non-volatile memory device to store at least one of configuration data or firmware that is accessed by the plurality of APs, wherein the at least one of configuration data or firmware enables operation of respective APs of the plurality of APs;

a controller communicatively coupled to the plurality of APs and the non-volatile memory device, wherein the controller is configured to centralize processing of messages received from the plurality of APs and to manage shared access to the non-volatile memory device by the plurality of APs; and a memory management unit (MMU) coupled between an application processor of the plurality of APs and the non-volatile memory device, wherein the MMU is to enforce permissions to access, by the application processor, a range of memory addresses of the non-volatile memory device by:

translating a logical address of an access request to determine an offset into the range of memory addresses;

determining the application processor has access permission, associated with a type of the access request, to the range of memory addresses; and storing, in a result register, a value indicative of the access permission that is useable by the controller to generate a message configured to fulfill the access request.

2. The system of claim 1, wherein the network is a platform network, and wherein the plurality of APs include a combination of at least two of: graphics processing units, a baseboard management controller, and one or more computing devices.

3. The system of claim 1, wherein at least one AP of the plurality of APs is to execute a second firmware to perform a security-related service.

4. The system of claim 1, further comprising a processing device that includes the controller, wherein the processing device is a system-on-a-chip comprising one of a field-programmable gate array (FPGA), a microcontroller, or a complex programmable logic device that includes an on-board volatile memory device.

5. The system of claim 1, further comprising a processing device that includes the controller and the MMU, wherein the processing device further comprises:

a volatile memory coupled to the MMU to store a translation data structure; and an out-of-band (OOB) agent device coupled to the volatile memory, the OOB agent device to configure the translation data structure with the range of memory addresses assigned to the application processor and with the access permissions for respective memory addresses of the range of memory addresses.

6. The system of claim 1, wherein the controller is a management controller comprising:

a transport controller coupled to an application processor of the plurality of application processors, the transport controller to receive a message from the application processor;

message processing logic coupled between the transport controller, the MMU, and a storage controller that is coupled to the non-volatile memory device, wherein the message processing logic is configured to:

determine that a command code of the message is valid;

obtain, from the MMU, a translated address corresponding to a memory address of the message and a permission to access the translated address;

replace, within the message, the memory address with the translated address to generate an updated message; and send the updated message to the storage controller for use in accessing a physical location in the non-volatile memory device matching the translated address.

7. The system of claim 6, wherein the management controller further comprises message parsing logic coupled between the transport controller and the message processing logic, the message parsing logic configured to parse the message such that the message processing logic can obtain information within the message, the system further comprising:

a first protocol interconnect bus coupled between the message processing logic and the MMU; and a second protocol interconnect bus coupled between the message processing logic and the storage controller.

8. The system of claim 6, wherein the message comprises a vendor-defined message within a protocol of the management controller, the message being one of:

a read request to read data from the memory address;

a posted write request to the memory address; or a non-posted write request to the memory address.

9. The system of claim 6, wherein the management controller is further to one of encrypt read data or decrypt write data associated with a read request or a write request, respectively, of the message using a standard encryption algorithm known to the plurality of APs.

10. The system of claim 6, further comprising a processing device that includes the controller, wherein the processing device further comprises the storage controller, which comprises:

a plurality of ports, each coupled to one of a plurality of management controllers that include the management controller;

a set of request queues, wherein each request queue is coupled to a different port of the plurality of ports and is to queue messages, including the message, and associated data;

a frontend arbiter coupled to the set of request queues, the frontend arbiter to iteratively select an entry from each of the set of request queues; and a backend controller coupled to the frontend arbiter and configured with a non-volatile memory protocol compatible with writing to and reading from the non-volatile memory device.

11. The system of claim 10, wherein the backend controller is further to one of encrypt write data or decrypt read data associated with a write request or a read request, respectively, of the message using a vendor-specific encryption algorithm associated with the application processor.

12. The system of claim 6, further comprising a processing device that includes the controller, wherein the processing device further comprises:

a cache coupled to and shared with the plurality of APs; and a directory controller coupled between the cache and the non-volatile memory device, wherein the directory controller is to implement cache coherency as between the plurality of APs.

13. The system of claim 6, further comprising an out-of-band (OOB) agent device coupled to the management controller, wherein the OOB agent device is to configure the MMU and others of the plurality of controllers to manage the shared access to the non-volatile memory device.

14. A system comprising:

a plurality of application processors (APs) including an out-of-band (OOB) agent device and at least one processing unit;

a non-volatile memory device to store at least one of configuration data or firmware that is accessed by the plurality of APs, wherein the at least one of configuration data or firmware enables operation of respective APs of the plurality of APs; and a processing device coupled to the plurality of APs and the non-volatile memory device, wherein the OOB agent device is positioned outside of the processing device, and wherein the processing device comprises:

a first management controller coupled to the OOB agent device;

a second management controller coupled to the at least one processing unit; and a memory management unit (MMU) coupled between the first and second management controllers, wherein the OOB agent device is to configure the MMU and the MMU is to enforce permissions to access, by the at least one processing unit, a range of memory addresses of the non-volatile memory device, wherein the permissions are communicated via values stored in a register indicating whether an access request is allowed or disallowed based on the range of memory addresses and a type of the access request.

15. The system of claim 14, wherein the processing device is a system-on-a-chip comprising one of a field-programmable gate array (FPGA), a microcontroller, or a complex programmable logic device that includes an on-board volatile memory device.

16. The system of claim 14, wherein the processing device further comprises a volatile memory coupled between the MMU and the second management controller, the volatile memory to store a translation data structure, and wherein the OOB agent device is to write entries within the translation data structure, each entry comprising at least a translated base address and permissions associated with a read request and a write request to the translated base address.

17. The system of claim 16, wherein the MMU comprises:

a register interface coupled to the second management controller; and a plurality of registers coupled to the register interface, wherein the plurality of registers comprises:

an address register to store a logical address, wherein the translation data structure is indexed by particular bits of the address register;

an access register to store whether a read access or a write access is requested;

a result register to store whether access is permitted; and a translated address register to store the translated base address, which is a physical address mapped to the logical address.

18. The system of claim 17, wherein the plurality of registers further comprises a control register to indicate an access request state, and wherein the second management controller is to:

store the logical address in the address register;

store a value in the access register to indicate one of the read access or the write access;

access values in the control register and the result register to determine that access is permitted to the translated base address in the non-volatile memory device; and retrieve the translated base address with which to update a message to be sent to a storage controller of the non-volatile memory device.

19. The system of claim 17, wherein the MMU further comprises access check logic coupled to the register interface and the volatile memory, the access check logic configured to:

detect an access check request received from the second management controller;

retrieve the logical address from the address register;

access the translation data structure to translate the logical address to the translated base address, which includes an offset into the range of memory addresses, and to determine an access permission associated with a type of the access check request;

store a value in the result register corresponding to the access permission; and store, in the translated address register, the translated base address.

20. The system of claim 16, wherein each entry further comprises a bit indicating whether a remapping of the range of memory addresses is taking place, and wherein the OOB agent device is further to:

communicate, through the first management controller, to the non-volatile memory device to move configuration data from the range of memory addresses to a new range of memory addresses;

assert the bit of each entry in the translation data structure to indicate to the second management controller that the at least one processing unit is to retry access requests during the remapping; and update the entries in the translation data structure to be mapped to the new range of memory addresses of the non-volatile memory device according to the remapping.

21. The system of claim 16, wherein each entry further comprises a bit indicating whether a remapping of the range of memory addresses is taking place, wherein a second range of memory addresses of the non-volatile memory device stores a known functional copy of firmware for the at least one processing unit, and wherein the OOB agent device is further to:

detect an error in a boot process of the at least one processing unit when booting with firmware stored at the range of memory addresses;

assert the bit of each entry in the translation data structure to indicate to the second management controller that the at least one processing unit is to retry access requests during the remapping; and update the entries in the translation data structure to be mapped to the second range of memory addresses of the non-volatile memory device according to the remapping.

22. The system of claim 14, wherein the OOB agent device includes a baseboard management controller (BMC) to configure the MMU.

23. The system of claim 14, wherein the at least one processing unit comprises one or more graphics processing units (GPUs), central processing units (CPU), or data processing units (DPUs).

24. A method of operating a system comprising a plurality of application processors (APs), a non-volatile memory device to be shared by the plurality of APs, and a processing device coupled to the plurality of APs and the non-volatile memory device, and a memory management unit (MMU) coupled between an application processor of the plurality of APs and the non-volatile memory device, wherein the method of operating the system comprises:

storing, in the non-volatile memory device, at least one of configuration data or firmware that enables operation of respective APs of the plurality of APs;

centralizing, by the processing device, processing of messages received from the plurality of APs;

managing, by the processing device, shared access to the non-volatile memory device by the plurality of APs; and enforcing, by the MMU, permissions to access, by the application processor, a range of memory addresses of the non-volatile memory device, wherein the enforcing comprises:

translating a logical address of an access request to determine an offset into the range of memory addresses;

determining the application processor has access permission, associated with a type of the access request, to the range of memory addresses; and storing, in a result register, a value indicative of the access permission that is useable by the processing device to generate a message configured to fulfill the access request.

* * * * *